(12) United States Patent
Learned (10) Patent No.: US 9,148,804 B2
(45) Date of Patent: Sep. 29, 2015

(54) METHOD AND APPARATUS FOR MAKING OPTIMAL USE OF AN ASYMMETRIC INTERFERENCE CHANNEL IN WIRELESS COMMUNICATION SYSTEMS

(71) Applicant: Rachel E. Learned, Waltham, MA (US)

(72) Inventor: Rachel E. Learned, Waltham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 4 days.

(21) Appl. No.: 13/998,566

(22) Filed: Nov. 7, 2013

(65) Prior Publication Data

US 2014/0126488 A1     May 8, 2014

Related U.S. Application Data

(63) Continuation of application No. PCT/US2013/031900, filed on Mar. 15, 2013.

(60) Provisional application No. 61/723,622, filed on Nov. 7, 2012.

(51) Int. Cl.
*H04W 4/00* (2009.01)
*H04W 24/02* (2009.01)
*H04W 16/14* (2009.01)

(52) U.S. Cl.
CPC .............. *H04W 24/02* (2013.01); *H04W 16/14* (2013.01)

(58) Field of Classification Search
None
See application file for complete search history.

(56) References Cited

U.S. PATENT DOCUMENTS 6,704,376 B2    3/2004    Mills et al.
6,947,505 B2    9/2005    Learned
(Continued)

FOREIGN PATENT DOCUMENTS

WO    WO 2010/066289 A1    6/2010
WO    WO 2011/006116 A1    1/2011
(Continued)

OTHER PUBLICATIONS

Learned; "Making Optimal Use of the Asymmetric Inference Channel;" IEEE; Signals, Systems and Computers (Asilomar); Nov. 6-9, 2011; pp. 1722-1727.
(Continued)

*Primary Examiner* — Afshawn Towfighi
(74) *Attorney, Agent, or Firm* — Daly, Crowley, Mofford & Durkee, LLP (57) ABSTRACT

A method and apparatus for transmitting and receiving in black space is described. The asymmetric interference channel is an appropriate model for many realistic scenarios, especially those arising more frequently as dynamic spectrum access (DSA) becomes more prevalent. As DSA nodes evolve to become more cognitive (e.g. self aware, environment aware, and adaptive), the prevailing white space seeking and gray space adapting policies leave a significant portion of the spectrum, namely, the black space, untapped. Described herein is a throughput versus SINR result and a corresponding technique for jointly choosing a transmission rate and multiuser detection algorithm that allows computationally constrained cognitive DSA nodes high rate operation in spectrum black space. Also described is an information theoretic motivated policy for seemingly insignificant waveform design choices that greatly enhance the throughput of a secondary sender-receiver pair while fulfilling a given complexity requirement within the secondary node's receiver.

20 Claims, 6 Drawing Sheets

(56) References Cited

U.S. PATENT DOCUMENTS

| | | | |
|---|---|---|---|
| 7,058,422 | B2 | 6/2006 | Learned et al. |
| 7,092,452 | B2 * | 8/2006 | Taylor et al. ............... 375/267 |
| 7,126,890 | B2 | 10/2006 | Learned et al. |
| 7,190,743 | B2 | 3/2007 | Learned |
| 7,218,690 | B2 | 5/2007 | Learned |
| 7,269,223 | B2 | 9/2007 | Learned et al. |
| 7,593,473 | B2 | 9/2009 | Learned et al. |
| 7,724,851 | B2 | 5/2010 | Learned et al. |
| 2001/0028675 | A1 | 10/2001 | Bierly et al. |
| 2002/0002052 | A1 | 1/2002 | McHenry |
| 2008/0198828 | A1 | 8/2008 | Reznik et al. |
| 2008/0293353 | A1 | 11/2008 | Mody et al. |
| 2009/0154534 | A1 | 6/2009 | Hassan |
| 2009/0258597 | A1 | 10/2009 | Chen et al. |
| 2010/0124930 | A1 | 5/2010 | Andrews et al. |
| 2010/0165956 | A1 | 7/2010 | Razzell |
| 2010/0289688 | A1 | 11/2010 | Sherman et al. |
| 2010/0304770 | A1 | 12/2010 | Wietfeldt et al. |
| 2011/0093540 | A1 | 4/2011 | Eisenberg et al. |
| 2011/0176508 | A1 | 7/2011 | Altintas et al. |
| 2012/0039183 | A1 | 2/2012 | Barbieri et al. |
| 2012/0071102 | A1 | 3/2012 | Palomar et al. |
| 2012/0108276 | A1 | 5/2012 | Lang et al. |

FOREIGN PATENT DOCUMENTS

| | | |
|---|---|---|
| WO | WO 2011/055319 A1 | 5/2011 |
| WO | WO 2013/180816 A2 | 12/2013 |
| WO | WO 2013/185150 A1 | 12/2013 |
| WO | WO 2014/052992 A1 | 4/2014 |

OTHER PUBLICATIONS

Verdu; "The Capacity Region of the Symbol-Asynchronous Gaussian Multiple-Access Chanel;" IEEE Transactions on Information Theory; vol. 35; No. 4; Jul. 1989; pp. 733-751.

Learned; "Making Optimal Use of the Asymmetric Interference Channel;" Asilomar Conference on Signals, Systems, and Computing; Presentation; Nov. 8, 2011; 63 pages.

U.S. Appl. No. 14/585,780, filed Dec. 30, 2014, Learned.

Ahmed, et al.; "Entropy Expressions and Their Estimators for Multivariate Distributions;" IEEE Transactions on Information Theory; vol. 35; No. 3; May 1989; pp. 688-692; 5 Pages.

Bahl, et al.; "Optimal Decoding of Linear Codes for Minimizing Symbol Error Rate;" IEEE Transactions on Information Theory; Mar. 1974; pp. 284-287; 4 Pages.

U.S. Appl. No. 14/437,350, filed Apr. 21, 2015, MacLeod, et al.

Neeser, et al.; "Proper Complex Random Processes with Applications to Information Theory;" IEEE Transactions on Information Theory; vol. 39; No. 4; Jul. 1993; pp. 1293-1302; 10 Pages.

Pham; "Fast Algorithms for Mutual Information Based Independent Component Analysis;" IEEE Transactions on Signal Processing; vol. 52; No. 10; Oct. 2004; pp. 2690-2700; 11 Pages.

Tufts; "Design Problems in Pulse Transmission;" Technical Report 368; Massachusetts Institute of Technology; Jul. 28, 1960; 52 Pages.

Tufts; "Nyquist's Problem—The Joint Optimization of Transmitter and Receiver in Pulse Amplitude Modulation;" Proceedings of the IEEE: vol. 53; Issue 3; pp. 248-259; 12 Pages.

Ungerboeck; "Channel Coding with Multilevel/Phase Signals;" IEEE Transactions on Information Theory; vol. IT-28; No. 1; Jan. 1982; pp. 55-67; 13 Pages.

PCT Transmittal and International Search Report of the ISA for Application No. PCT/US2013/47026 dated Jun. 21, 2013; 4 Pages.

PCT Written Opinion of the ISA for Application No. PCT/US2013/47026 dated Jun. 21, 2013; 12 Pages.

PCT Transmittal and International Search Report of the ISA for Application No. PCT/US2013/68710 dated Jan. 7, 2014; 4 Pages.

PCT Written Opinion of the ISA for Application No. PCT/US2013/68710 dated Jan. 7, 2014; 11 Pages.

PCT Transmittal and International Search Report of the ISA for Application No. PCT/US2013/031900 dated Jan. 15, 2014; 5 Pages.

PCT Written Opinion of the ISA for Application No. PCT/US2013/031900 dated Jan. 15, 2014; 7 Pages.

PCT International Preliminary Report dated May 21, 2015 corresponding to International Application No. PCT/US2013/031900; 9 Pages.

PCT International Preliminary Report dated May 21, 2015 corresponding to International Application No. PCT/US2013/068710; 9 Pages.

* cited by examiner

METHOD AND APPARATUS FOR MAKING OPTIMAL USE OF AN ASYMMETRIC INTERFERENCE CHANNEL IN WIRELESS COMMUNICATION SYSTEMS

CROSS REFERENCE TO RELATED APPLICATIONS

This application claims the benefit of application No. 61/723,622 filed on Nov. 7, 2012 under 35 U.S.C. §119(e) which application is hereby incorporated herein by reference in its entirety. This application is also a continuation of and claims priority from co-pending application number PCT/US2013/031900 filed in the English language in the United States Receiving Office on Mar. 15, 2013 which application is hereby incorporated herein by reference in its entirety.

STATEMENT REGARDING FEDERALLY SPONSORED RESEARCH

This invention was made with government support under Contract No. FA8721-05-C-0002 awarded by the U.S. Air Force. The government has certain rights in the invention.

FIELD OF THE INVENTION

The concepts described herein relate generally to wireless communication, and more particularly to systems and techniques for making optimal use of an asymmetric interference channel in a wireless communication system.

BACKGROUND OF THE INVENTION

As is known in the art, advancements have been made over the past 20 years or so to understand, manipulate, and develop reasonable complexity receiver-algorithms for use with a multiple access channel (MAC). Much has been learned in the context of the MAC regarding the benefit of encouraging other-user-interference in a many-to-one scenario. The many-to-one scenario that is truly represented by the MAC formulation, by default, corresponds to having some level of coordination among users. Researchers have found that for this scenario, signature signal design, prudent assignments of users' rates and low overhead collision management lead to significantly higher throughput for the "interfere on purpose" mode of operation as compared to the main stream approach to avoid interference at all costs.

In parallel, the field of multiuser detection (MUD) has evolved to produce a plethora of receiver algorithms capable of decoding interfering signals with varying levels of implementation complexity for varying degrees of interference. A small sampling of such algorithms can be found in S. Verdu, Multiuser Detection. Cambridge University Press, 1998; R. E. Learned, A. S. Willsky and D. M. Boroson, Low complexity optimal joint detection for over-saturated multiple access communications, IEEE Trans. On Signal Processing, Vol. 45, no. 1, January 1997; and R. E. Learned, B. Hombs, M. Lande, J. Tranquilli, L. Russo, J. Farkas, J. Niedzwiecki, Y. Eisenberg, K. Connor, M. Sherman, L. R. Brothers, B. Pierce, J. DeBardelaben, Interference Multiple Access Wireless Network Demonstration Enabled by Real-Time Multiuser Detection, proceedings for the IEEE Radio Wireless Symposium, January, 2008.

Equally important, and perhaps more common, is the problem in which other-user-interference is not within one's control. This scenario has also been well studied over the past 10 years or so and is best modeled by what is referred to as an "interference channel." The interference channel has multiple sender-receiver pairs, where the pairs are not related or coordinated with each other. One important difference between the interference channel and the MAC is that in an the interference channel scenario, each receiver is only interested in what its corresponding transmitter has sent.

SUMMARY OF THE INVENTION

Described herein is a method and apparatus for transmitting and receiving in black space. The asymmetric interference channel is an appropriate model for many realistic scenarios, especially those arising more frequently as dynamic spectrum access (DSA) becomes more prevalent. As DSA nodes evolve to become more cognitive (e.g. self aware, environment aware, and adaptive), the prevailing white space seeking and gray space adapting policies leave a significant portion of the spectrum, namely, the black space, untapped. Thus in accordance with the concepts, system and techniques sought to be protected herein, described is a throughput versus SINR result and a corresponding technique for jointly choosing a transmission rate and multiuser detection algorithm that allows computationally constrained cognitive DSA nodes high rate operation in spectrum black space.

Also described is an information theoretic motivated policy for seemingly insignificant waveform design choices that greatly enhance the throughput of a secondary sender-receiver pair while fulfilling a given complexity requirement within the secondary node's receiver. It has been found that using this technique results in typical throughput improvements of 10 to 50 times over the traditional approach to maintaining a disadvantaged link within an asymmetric interference channel.

The concepts, systems and techniques described herein focus on a scenario that is a subset of the interference channel where the sender-receiver pair is allowed to act selfishly while being mindful of its processing limitations (e.g. due to its compute hardware limitations). The selfish pair is faced with only one goal, namely, to maximize throughput in the presence of interference while making use of the computational resources available on their nodes. There is no regard for the other users' link quality. This scenario has two parts. First, the computational constraint exists in all practical wireless nodes. This is caused by the tendency of multi-used detection (MUD) algorithms to be impractical in the presence of highly correlated interference, even when there are only two interfering signals and relatively short delay spreads. Second, the ability to act selfishly can be an inherent quality for many operational DSA scenarios, two of which are described hereinbelow as example.

Described herein is a policy guide for secondary spectrum access and a guide for minimal waveform adaptation that a cognitive secondary user DSA radio system should employ to make use of (and ideally make optimal use of) its local radio frequency (RF) environment. The cognitive (secondary user) DSA sender-receiver pair knows the rate that it would like to achieve, but it is limited by the available spectrum as well as its inherent power and bandwidth constraints. The concepts, systems and techniques described herein extend this view to include the node's limited ability to process complex received signals. Each occupied, black space band under consideration will have associated with it an achievable rate region and a rate line representing a primary user's established raw transmission or information transmission rate. Such established raw transmission or information transmission rates, have been well established in the interference channel literature in recent years. The concepts, systems and techniques described herein extend this understanding of black space overlay to include the "tiling" of the rate region with the different detectors possible to achieve the desired rate with the desired algorithm.

The policy guide described provides a technique to grade the black space by the complexity-constrained achievable rate that can be derived from the detector-tiled rate region, not just the achievable rate.

Also described is a waveform adaptation for a secondary sender-receiver pair to make choices for its transmit signature pulse such that it occupies the primary user's black space while maintaining a slight difference in cross correlation between the primary user and secondary user signature signals. This is motivated by significant improvements in the rate region and the increase in area of the tiled regions for moderate complexity MUD algorithms that result when cross correlations between highly interfering signals is reduced by even a small amount (e.g. from 1 to 0.9).

Also described is the potential of such a policy/waveform guideline by illustrating a trade space between complexity-constrained rate and interference to signal ratio (ISR) as well as cross correlation.

In accordance with a further aspect of the concepts, systems and techniques described herein, it is appreciated that in a fielded system, it may be desirable or even necessary to utilize suboptimal combinations of MUD and error correction. Or it may be desirable or even necessary to utilize a MUD with knowledge of the interfering signal's modulation but with no knowledge of the interfering signal's error correction code. It has been recognized that for these cases, care must be taken to avoid capacity-based achievable rate bounds which are too optimistic and which could thus lead to a tool that ranks potential black space as being a valid option when, in fact, occupation of such black space would result in a failed link for the disadvantaged user. Thus, it has been recognized that it is important to ensure that one computes tight bounds for a realistic joint rate region. To do this, the approach described herein can be used, but rather than utilizing overly optimistic capacity bounds, one can derive bounds from mutual information based upon the true symbol by symbol received probability density functions. Using the mutual information based upon the aggregate received signal from both transmitters A and a will result in a smaller region when compared the capacity region.

BRIEF DESCRIPTION OF THE DRAWINGS

The foregoing features of the concepts, systems and techniques, as well as the concepts, systems and techniques themselves, may be more fully understood from the following description of the drawings in which.

DETAILED DESCRIPTION OF THE PREFERRED EMBODIMENTS

Before describing a method and apparatus for making optimal use of an asymmetric interference channel in a wireless communication system, some introductory concepts and terminology are explained. Communicating data from one location to another requires some form of pathway or medium between the two locations. In telecommunications and computer networking, a communication channel, or more simply "a channel," refers to a connection between two locations over a transmission medium. The connection may, for example, be a logical connection and the transmission medium may be, for example, a multiplexed medium such as a radio channel. A channel is used to convey an information signal, for example a digital bit stream, from one or several source or sending nodes (or more simply sources or transmitters) to one or several destination or receiving nodes (or more simply destinations or receivers). Regardless of the particular manner or technique used to establish a channel, each channel has a certain capacity for transmitting information, often measured by its frequency bandwidth in Hz or its data rate in bits per second. The concepts systems and techniques described find application in a wide variety of applications including, but not limited to: satellite communications (SATCOM), as well as with optical communications, wired communications (e.g. communications over a cable or other type of wire) and magnetic storage applications.

A coexistence cognitive radio and related techniques as described herein are capable of assessing a frequency spectrum, determining candidate bands in which other independent radios are already operating, and successfully sharing access of an already occupied frequency band with an independent radio system. The subject coexistence cognitive radios successfully transmit and receive in the pre-occupied band without detrimental harm to the pre-existing radio system that was already operating in that band. Moreover, the pre-existing radio system already operating in that band requires no additional capabilities to co-exist with the subject system. Specifically, the pre-existing radio system is not expected to communicate with the coexistence cognitive radio to accomplish the virtual negotiation to settle upon an agreeable co-existence of the two systems.

When the connections establish transmission of a signal in one direction between the nodes, the connections are generally referred to as links. Each node typically performs a switching function and one or more additional functions.

The nodes may be coupled together in a variety of different network structures typically referred to as network topologies. For example, network nodes made be coupled in a circular structure, generally referred to as a ring topology. Other topologies such as mesh topologies, star topologies and tree topologies are also known.

The transmission of a signal from a first or source node to a second or destination node may involve the transmission of the signal through a plurality of intermediate links and nodes coupled between the source node and the destination node. Such a succession of links and nodes between a source node and a destination node is referred to as a path.

Figure 1:
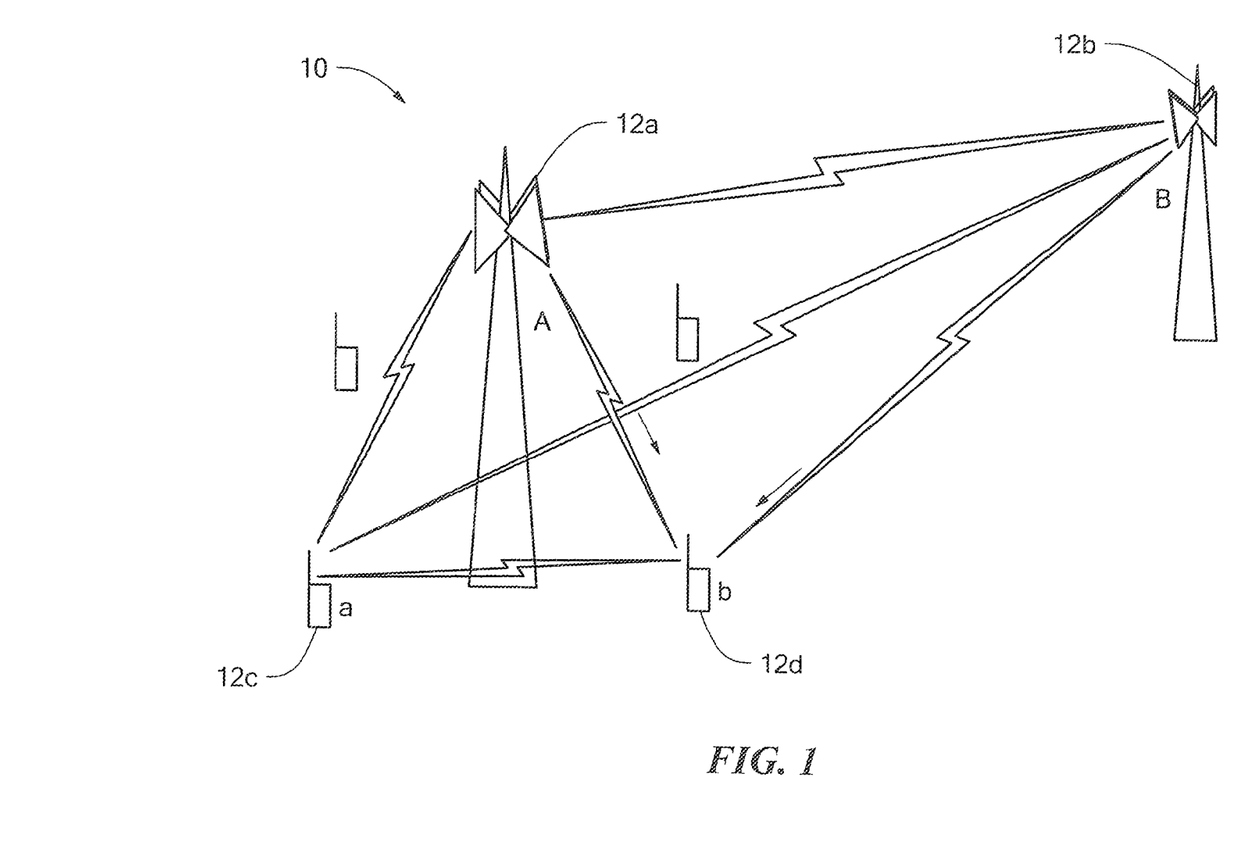
FIG. 1 is a diagram illustrating a sender-receiver pair AB as a primary user which is said to be advantaged due to its advantaged transmit/receive scenario (e.g. high power, elevated transmitter, may have multiple receive antenna elements, etc.). Sender—receiver pair ab is the secondary user which is said to be disadvantaged (lower power link, ground-level transmitter).

Referring now to FIG. 1 a network includes a plurality of nodes designated Node A (and also with reference numeral 12a), Node B (and also with reference numeral 12b), Node a (and also with reference numeral 12c) and Node b (and also with reference numeral 12d). Node A is transmitting to enable link closure with a similar Node B which is distant from Node A. Although the network is here shown to include four nodes, those of ordinary skill in the art will appreciate, of course, that the network may include any number of nodes with four nodes here being shown to promote clarity in the drawings and written description of the broad concepts described herein.

A First User On Channel (FUOC) begins to transmit from node A to node B in a free-and-clear channel. Thus, this channel is now "occupied." A Second User On Channel (SUOC) operates with a coexistence cognitive radio (also sometimes referred to herein as a SUOC radio). By definition, a SUOC user intends to find and co-occupy the same band at the same time as an FUOC user. The concepts, systems and techniques described herein focus on the SUOC user making use of the channel occupied by links BA and AB.

FIG. 1 illustrates the first "selfish-enabling" scenario where one wishes to form a link between node a and node b in the presence of node A that is already transmitting to enable link closure with the similar distant node B. As shown in FIG. 1, the AB sender-receiver pair is advantaged relative to the ab sender-receiver pair. Specifically the received power corresponding to the BA (AB) link will be of a much greater power than the interference seen at node A (B) due to transmissions from nodes a and b.

There is a drastic asymmetry in this scenario depending if the system being considered is the ab system or the AB system. This is the asymmetric interference channel. Being the disadvantaged pair, ab, in an asymmetric interference channel often means that the sender-receiver pair ab can act selfishly because it will not significantly affect the ability of the AB pair to operate.

An asymmetric interference channel would also result when a sender-receiver pair becomes the victim of a malicious broadcast or sender-receiver pair that attempts to overwhelm the previously operating pairs with interference by taking over the use of the channel with moderate to high power transmissions. In this case, the original lower power sender receiver pair may negatively affect the malicious user if it were to continue to emit. In such a case, one would either not care about the malicious user, or the malicious user would simply increase power to maintain the desired rates in the presence of the original lower power sender-receiver pairs.

The value of seeing the interference channel as virtual white space will next be described.

To illustrate the value of understanding and making full use of the interference channel, an example is offered. Consider a set of wireless dynamic spectrum access (DSA) radio (SDR) nodes, ab. These nodes make use of pre-allocated channels by taking on the role of secondary user in the presence of primary users that have leased the channel but may or may not be active at any given time. The typical policy of such systems is to find and occupy white space, meaning they avoid spectrum that contains emissions (the black space) and utilize empty spectrum (the white space). As SDR's become more common, there will be much competition for the available white space, while the black space will remain untapped.

For many of the black space options, the scenario of coexistence would constitute an asymmetric interference channel, making that black space channel as useful, under many conditions, as a white space channel. The following example from T. Cover, J. Thomas, Elements of Information Theory, Wiley and Sons, 1991 illustrates this point.

A disadvantaged sender-receiver pair identifies the existence of black space that would offer an asymmetric interference channel. The disadvantaged receiver identifies the existing black space signal as having a specific baud rate and modulation scheme and determines that it is receiving this interfering signal at a greatly reduced rate relative to the received power of this signal. In other words, the message that is not of interest is being received at a rate far below capacity, so this message can easily be decoded without error and subtracted off the received signal, to leave an interference-free received signal containing only the message of interest. For this particular case of the asymmetric interference channel, the message of interest may be sent at a rate equal to the capacity of the single user channel as if the interfering signal were absent. It should, of course, be appreciated that proper adjustment must be made for any gain control and digitization that would be required that might effectively act as noise to an interference channel that is greater than the noise of the free-and-clear (FAC) channel.

The rate of data that could be transmitted from node a to node b would traditionally be computed as the rate (R) that can be achieved with a matched filter (MF) based receiver is $R_{MF}$.

$$R_{MF} \leq \tfrac{1}{2} \log(1 + (P_{ab}/(N + P_{Ab})))$$

where $P_{ab}$ ($P_{Ab}$) is the received power at node b due to the transmission from node a (A), and the interfering signal from node A is modeled to be white Gaussian noise. N is the background noise power or variance of the white Gaussian noise that would be present even in the absence of interference. Alternatively, the rate that could be achieved if the interference were not present is the free-and-clear (FAC) rate, $$R_{FAC} \leq \tfrac{1}{2} \log(1 + P_{ab}/N)$$

In the presence of a high powered interferer, the difference between these two rates can be dramatic. For example, if the received powers corresponding to the individual transmissions from nodes a and A are 10 dB and 20 dB, respectively, the rate ratio corresponding to a's choice of seeking whitespace or operating with a matched filter receiver in system AB's black space is $R_{FAC}/R_{MF} = 22$.

It is noted that occupied space is not useful if it is simply treated interference as unstructured noise. However, with a MUD receiver, occupied space can be equivalent to a free and clear channel. This depends, however, upon characteristics of an interfering signal(s) including, but not limited to: (1) received power of a FUOC (e.g. Node A in FIG. 1) and rate at the node of a SUOC (e.g. nodes a and b in FIG. 1); FUOC's "view" of its signals of interest (the signals from the other FUOC radios); and FUOC's capability to mildly adapt in the presence of interference. This means that radios with MUD receivers do not need to look only for "white space" (or unoccupied space), but can also use "black space" (or occupied space) in the spectrum. Thus, a MUD receiver in the SUOC enables successful wireless communications in the same band as the FUOC because a MUD receiver can effectively remove the interference from the FUOC and help the SUOC "see through" that interference in order to "see" the signal of interest from the other SUOC transmitter(s).

Figure 2:
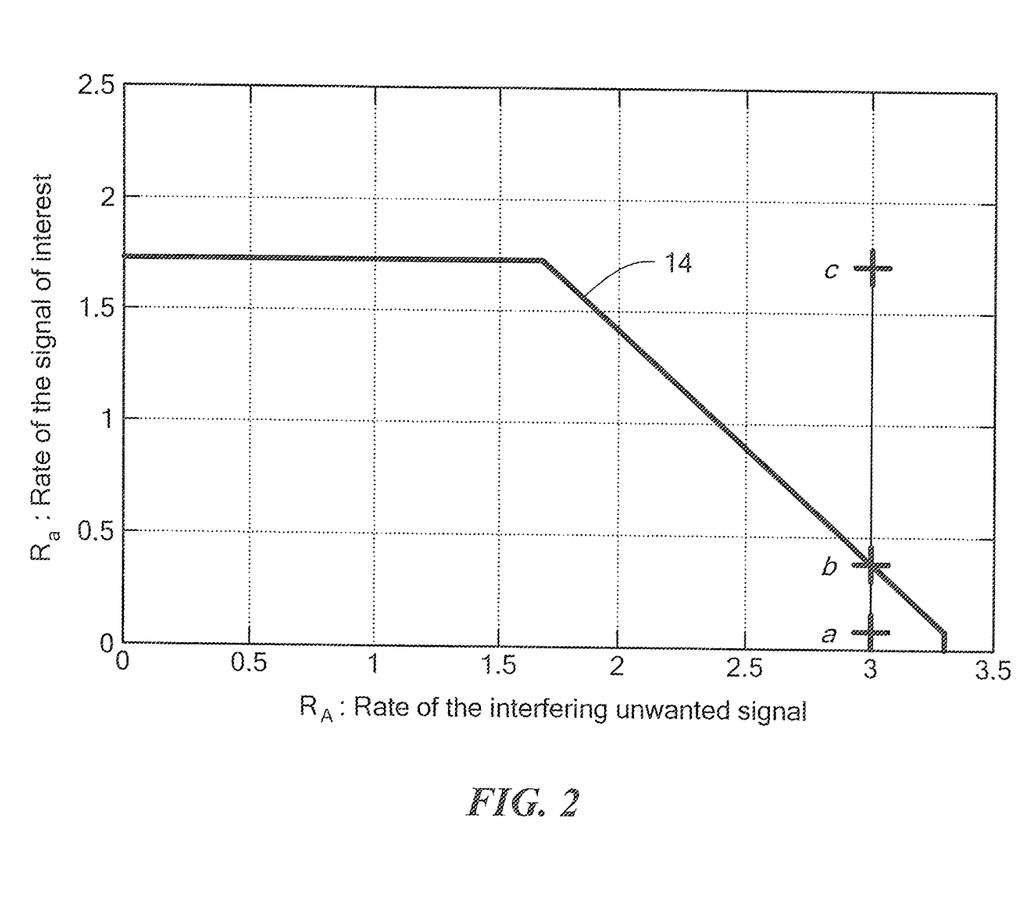
FIG. 2 is a plot of Rate of a Signal of Interest ($R_a$) vs. Rate of an Interfering Unwanted Signal ($R_A$) which illustrates a multiple access channel (MAC) achievable rate region. Rates are presented in bits per channel use. $SNR_{ab}=10$ dB, $SNR_{Ab}=20$ dB. Node A transmits 8PSK. Signature signals originating from nodes a and A are perfectly correlated.

Referring now to FIG. 2, a curve 14 shows the MAC rate region corresponding to receiver b's view of both the signal of interest from node a and the interfering signal from node A. For this case, node a's signature pulse was chosen to perfectly correlate with node A's signature pulse to result in a cross correlation of 1 between the two signals (worst case for the sum rate bound). The rate of A's transmitted message is out of the control of the sender-receiver pair ab, so it is simply plotted on this figure as a vertical line that intersects the $R_A$ axis at A's rate. Unless node b has knowledge of the code used for this message, then this is the raw channel baud rate of A's transmitted signals.

FIG. 2 includes three labeled points (labeled "a," "b," and "c" in FIG. 2) at three different possible transmission rates for node a. Point a is at the matched filter rate $R_{MF}$ that can be achieved with the traditional approach of treating the interference as unstructured noise. Point b is at the mud receiver rate $R_{MUD}$ which is the rate that can be achieved with a high complexity optimal MUD joint detection decoding algorithm. Point c is at the free and clear channel rate $R_{FAC}$ which lies outside of the achievable rate region and cannot be achieved with the current constraint on power and choice of signature pulse that resulted in this rate region.

By examination of FIG. 2 alone, it is possible to conclude that this disadvantaged link could operate at a rate $R_{MUD}=0.4$ bits per channel use by employing MUD in the receiver. This is a 4-fold increase in the rate that would be possible if it were to employ a matched filter, $R_{MF}=0.1$.

Instead, however, one may compare $R_{MUD}$ for this case to $R_{FAC}=1.7$ bits per channel use that might be possible if this disadvantaged pair to were to employ the more traditional whitespace seeking policy. Choosing to adopt an interfere-on-purpose strategy would be viewed as providing a mere 24% of the potential throughput. Moreover, the disadvantaged user pair may not possess the computational resources to employ an optimal (or high complexity approximation to the optimal) MUD receiver algorithm that would be required to operate in the presence of the other-user interference.

Figure 3:
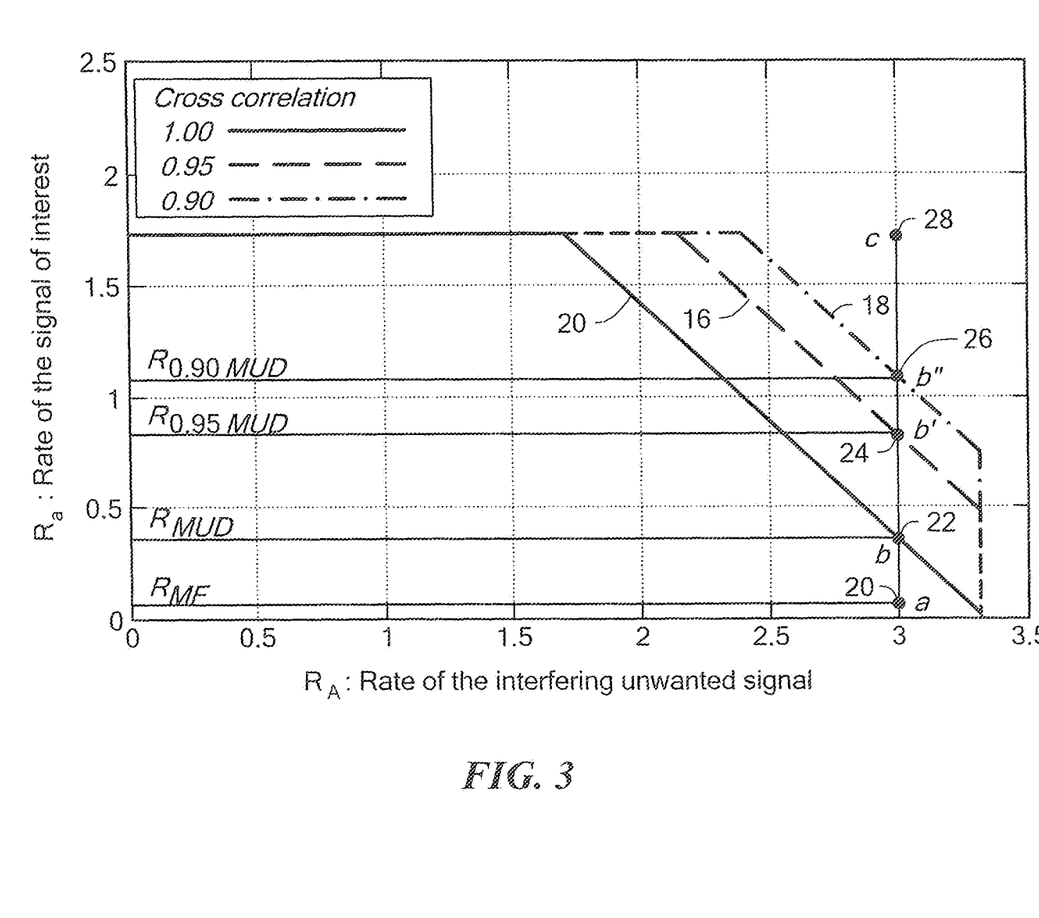
FIG. 3 is a plot of Rate of a Signal of Interest ($R_a$) vs. Rate of an Interfering Unwanted Signal ($R_A$) which illustrates a MAC Achievable rate region for MUD and MF rates $R_{MUD}$, $R_{MF}$. Bits per channel use. $SNR_{ab}=10$ dB, $SNR_{Ab}=20$ dB. Correlation between signals transmitted from nodes a and A are 1, 0.95, and 0.9. Node A transmits 8PSK.

Referring now to FIG. 3, this figure illustrates the more realistic cases of when node a's signature pulse is not perfectly correlated with node A's signature pulse. Curves 16, 18 represent two examples of cross correlation, 0.95 and 0.9, as well as the artificially perfect correlation (curve designated with reference numeral 20) that was the case for FIG. 2 (it should be noted that this is for the same power differences used for FIG. 2). The MAC joint rate region for partially correlating signals is derived in S. Verdu, The Capacity Region of the Symbol-Asynchronous Gaussain Multiple-Access Channel. IEEE Trans on Info Theory, Vol. 35, no. 4, July 1989.

This slightly less than full correlation would be the case if any of the following were true: the received symbols are maintained to be asynchronous (with the best case being a timing offset of half a baud); a multi-port receive antenna that realizes even a slight difference in receive line of bearing, directional channel weights (for multipath channels) or polarization between received signals from nodes a and A; a's signal occupies additional bandwidth in A's guard band, or occupies slightly less than A's band, or is slightly offset from A's band; etc.

It should be noted that FIG. 3 includes five labeled points designated with reference numerals 20-28 with points 20, 22 and 28 being the same as points a, b, c in FIG. 2. It should be noticed that point b' (designated by reference numeral 24) is at a rate $R_{0.95MUD}=0.85$, which is 2.13 times higher than $R_{MUD}=0.4$ at point b. It should also be noticed that point b" (designated by reference numeral 26) is at a rate $R_{0.9MUD}=1.15$, which is 2.88 times higher than $R_{MUD}=0.4$ at point b. For such cases, the signal transmitted by node a is still considered to be occupying system AB's spectrum. This would leave existing white space for other DSA SDR's. The rate, $R_{0.9MUD}$, for this black space seeking MUD-enabled sender-receiver pair is 68% of the FAC rate that would be possible if this pair were to occupy white space. It should be noted that if the unwanted interfering signal's rate were lower (e.g., perhaps closer to 2.5 bits per symbol), the points b' and b" would be even closer to the FAC rate at point c.

Taking into account easily achievable adaptive waveform design choices as well as naturally occurring slight differences between the received signature signals associated with node a and node A, analysis leads to the realization that occupying black space in an interference channel, armed with a MUD receiver, could allow one to realize the same or nearly the same rate that would be possible if one were to occupy a free channel. This means that if white space is scarce, or if white space is non-persistent (often called gray space), a secondary user might still be able to operate at or only slightly below its maximum potential by choosing to occupy black space instead of white space.

In general, a wireless communication node will not be equipped with the computational horsepower to implement an optimal (or even a near-optimal) joint detection-decoding MUD, but might easily accommodate a matched filter successive interference canceler (MF-SIC), or minimum mean squared error (MMSE) MUD or a MMSE-SIC.

Figure 4:
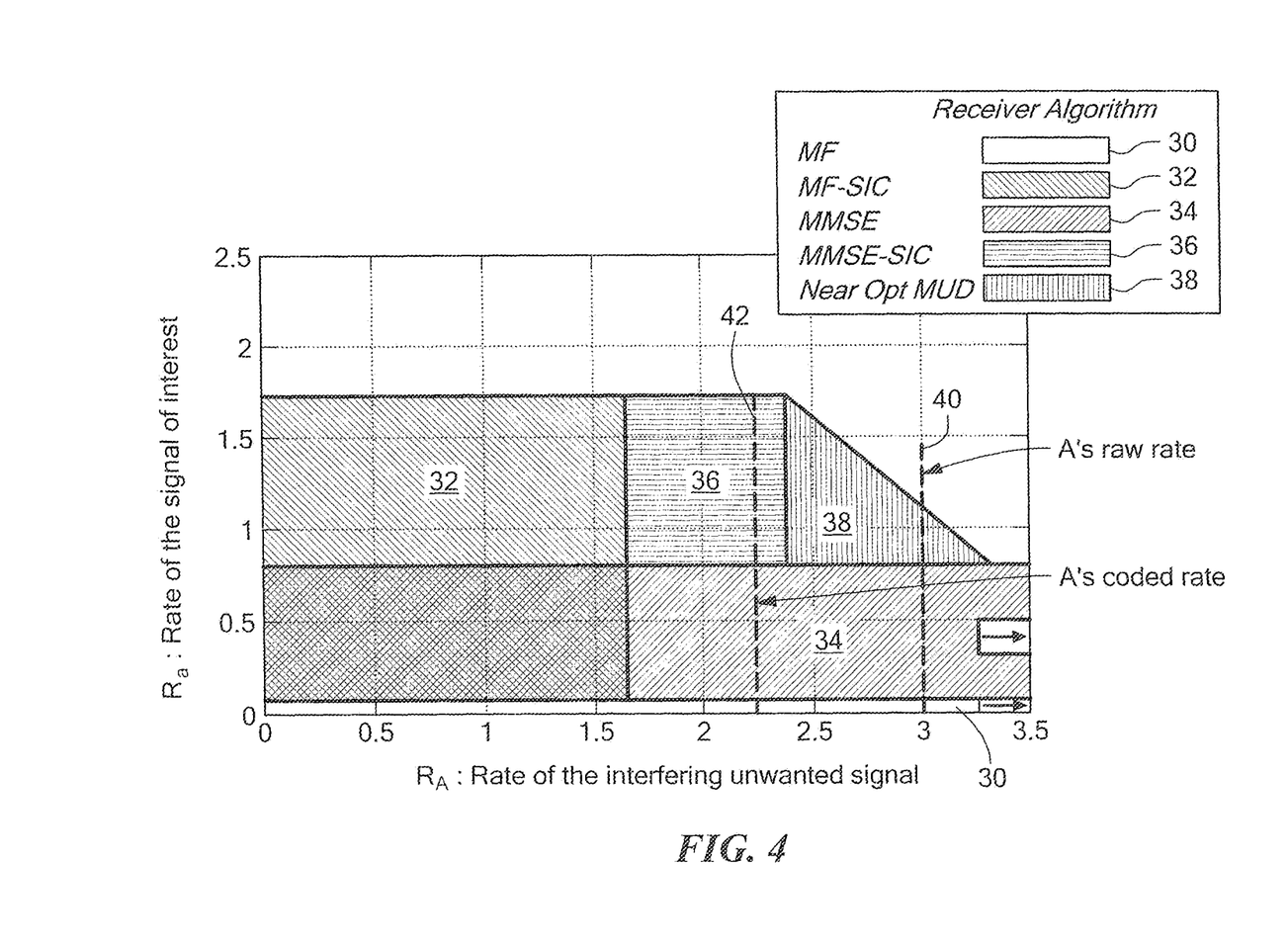
FIG. 4 is a plot of Rate of a Signal of Interest ($R_a$) vs. Rate of an Interfering Unwanted Signal ($R_A$) which illustrates a MAC Achievable rate region for a plurality of different receiver algorithms. SNRab=10 dB, SNRAb=20 dB. Correlation between signals transmitted from nodes a and A is 0.9. Node A transmits 8PSK and utilizes a ½ rate code.

FIG. 4 shows the achievable rate region parsed into five (5) subregions labeled 30-38 with each of the subregions associated with receiver algorithms that can achieve the rates in those regions. It should be noted that the cross-hatched region of FIG. 4 represents an overlap of regions 32 and 34.

Also shown in FIG. 4 are both A's original raw rate line 40 (assuming receiver b does not have A's code book) and a lower rate line 42 for the case where A's code book is known by node b. The code book and other transmit chain details might be known, for example, from a published specification for A's signal.

The rate for node a's transmission can now be chosen to be any point that would constitute an $(R_a; R_A)$ rate pair that lies on A's rate line and remains within the overall achievable rate region as shown in FIG. 4. It should b noted that the region of FIG. 4 differs slightly from the MAC rate region since this region depicts rate pairs for which the decoding of user a's signal is possible, even if the signal from user A cannot be successfully decoded.

It should also be noted from FIG. 4 that as one moves up on node a's rate line, one progresses through different subregions corresponding to different complexity receiver algorithms. Also notice that there is a significant improvement if one could choose a rate for node a from the lower (encoded) rate line for node A. Specifically, one not only has choices for low complexity receiver algorithms since that line intersects low complexity MUD subregions, the line intersects the rate region boundary at a higher maximum achievable rate for node a.

For this particular case of received powers and cross correlation between signals from nodes a and A, the FAC rate is possible only if node b knows A's code book and can take on the added computational complexity of decoding A's signal as part of the receiver algorithm. For example, if an MMSE-SIC were used, then after the application of the MMSE, node A's signal would need to be decoded and then reconstructed so that it could be stripped off the received signal to reveal the virtual FAC signal that is due only to node a's transmission. For some codes, adding this complexity to a moderately complex MMSE receiver would be prohibitive with existing processors, and/or may introduce a latency that is unacceptable for the ab link.

Figure 5:
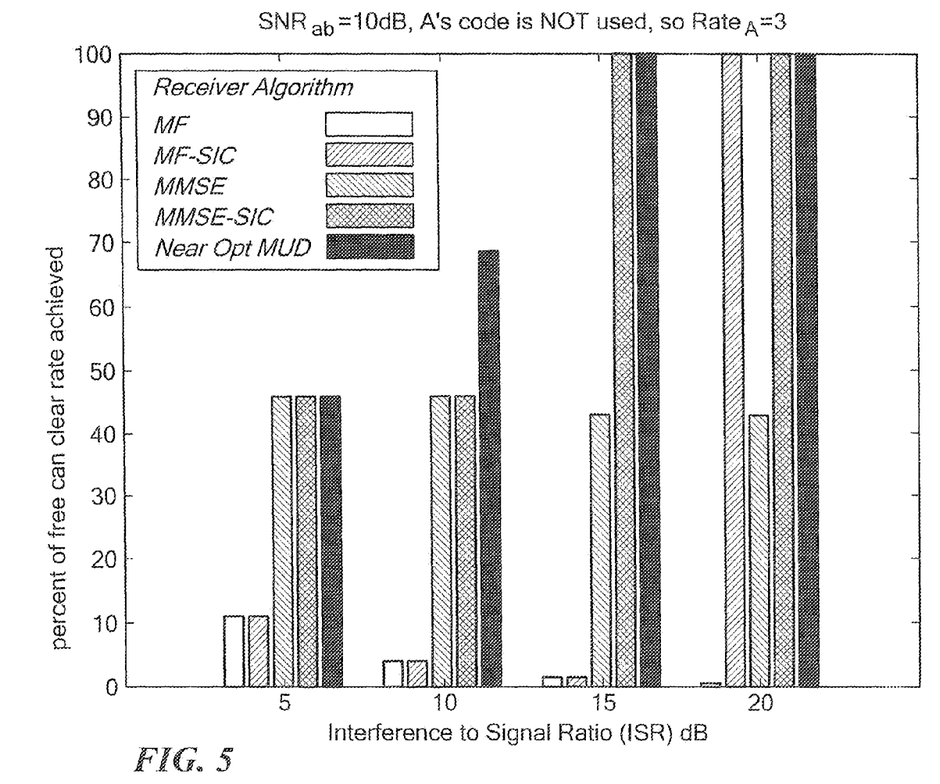
FIG. 5 is a bar graph of percent of the free and clear rate achieved vs. interference to signal ratio (ISR) in dB which illustrates throughput as the percent of the free and clear rate versus interference to signal ratio (ISR). The percent of the free and clear rate is for node a's transmission to node b in the presence of an interference signal from node A as depicted in FIGS. 1 and 4. SNRab=10 dB, cross correlation between signals a and A is 0.9.
Figure 6:
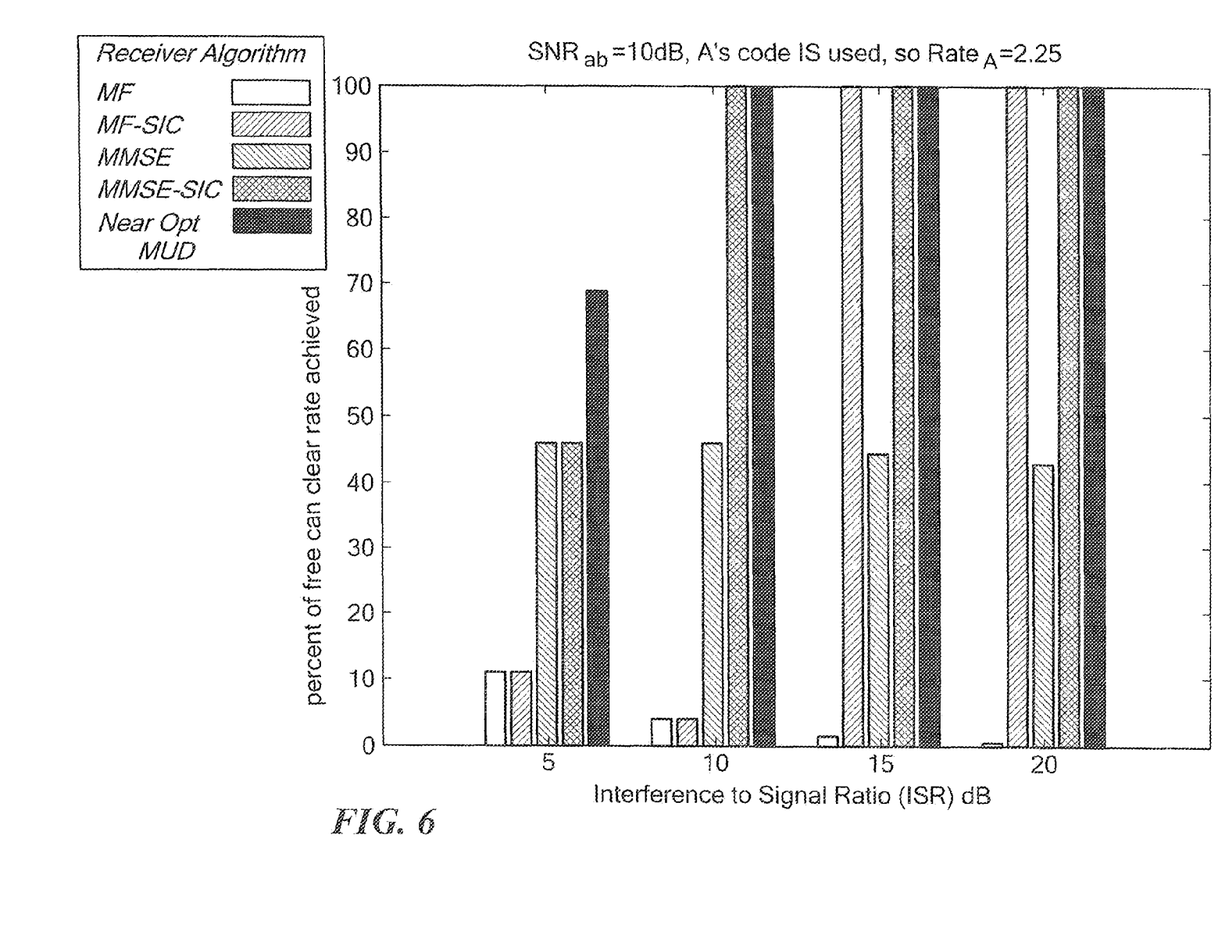
FIG. 6: is a bar graph of percent of the free and clear rate achieved vs. interference to signal ratio (ISR) in dB which illustrates throughput as the percent of the free and clear rate versus interference to signal ration (ISR). SNRab=10 dB, cross correlation between signals a and A is 0.9. User A's error correction code and necessary waveform specifications are known at node b to enable the use of error correction decoding of user A's signal in node b.

FIGS. 5 and 6 show the relative throughput versus interference to signal ratio (ISR) for each of the different receiver types. Both FIGS. 5 and 6 show the percent FAC rate for the ab link with the received FAC SNRab=10 dB and $\rho$=0:9. FIG. 5 shows the relative throughput when the receiver has no knowledge of the interfering signal's codebook, while FIG. 6 assumes the receiver "knows" (i.e. has stored therein or has access to) the codebook and other information necessary from the interfering signal's waveform specification to perform error correction decoding on the interfering signal.

Notice that as the interference power is increased, the matched filter (identified with reference numeral 1 in FIG. 6), as expected becomes less effective, in terms of the rate that is enabled for the disadvantaged ab link.

As also expected, for the case of very high interference to signal ratio (ISR), both of the interference canceling MUDs (MF-SIC and MMSE-SIC) as well as the Near Optimal MUD are capable of enabling a full rate link for the disadvantaged sender-receiver pair. The MMSE MUD falls short of achieving the FAC rate because it is effectively blocking out the interference signal (e.g. optimal linear nulling) at the expense of receiving less than all of a's signal.

Without applying the constraint on computational complexity, the DSA radio may choose to occupy black space for which it is ill equipped to perform the necessary detection algorithms to realize the potential for the required rate. This analysis reveals that a DSA pair capable of learning basic information about its local RF environment will be advantaged by making spectrum location decisions not only based upon a local spectral map, but also based upon its own needs for throughput and its capabilities for receiver processing.

FIGS. 5 and 6 illustrate that if this particular black space occupying scenario faced by the ab sender-receiver pair was limited by an ISR of 15 dB, three options would include: (1) closing the ab link at the FAC rate with an MMSESIC using A's raw channel bits for the reconstruction and stripping off of A's signal; (2) closing the ab link at the FAC rate with an MF-SIC that uses A's decoded bits to reconstruct and strip off A's signal; and (3) closing the ab link at 42% of the FAC rate without having to recreate and strip off A's signal.

With respect to option (1) (i.e. closing the ab link at the FAC rate with an MMSESIC using A's raw channel bits for the reconstruction and stripping off of A's signal), for this receiver, the joint MMSE filter would need to be computed, but the only error correction decoding would be that for the signal of interest. This is the result seen from FIG. 5.

With respect to option (2), (i.e. closing the ab link at the FAC rate with an MF-SIC that uses A's decoded bits to reconstruct and strip off A's signal), for this receiver, no MMSE filter is needed, so no matrix inversion or joint MMSE estimation would need to be done. Still, the complexity may be too high for node b's processing constraints since two error correction decoders would need to be implemented, one for the primary unwanted signal from node A and one for the signal of interest from node a. This is the result seen from FIG. 6.

With respect to option (3) (i.e. closing the ab link at 42% of the FAC rate without having to recreate and strip off A's signal), only the single a-centric MMSE MUD would need to be computed or estimated. The only error correction decoding would be that for the signal of interest. This is seen from FIG. 5.

Having described preferred embodiments of the concepts, systems and techniques for which protection is sought, it will now become apparent to those of ordinary skill in the art that other embodiments incorporating these concepts, systems and techniques may be used. Accordingly, it is submitted that that the concepts, systems and techniques should not be limited to the described embodiments but rather should be limited only by the spirit and scope of the appended claims.

The invention claimed is:

1. A method for radio frequency (RF) communication between a plurality of nodes in a network, the network having one or more first users on a channel (FUOCs) and one or more second users on a channel (SUOCs), the method comprising:
   identifying, in a multiuser detection (MUD) receiver at a SUOC node, an interference channel;
   determining a rate at which a FUOC node is operating in the interference channel;
   determining, based at least upon the rate at which the FUOC node is operating, a rate and a MUD receiver algorithm that allow the SUOC node to operate in the identified interference channel; and
   operating in the identified interference channel using the determined rate and MUD receiver algorithm that allow the SUOC node to operate in the identified interference channel.

2. The method of claim 1 wherein determining a rate at which the FUOC node is operating comprises determining an information rate, a channel rate, or a symbol rate.

3. The method of claim 1 wherein determining a rate that allow the SUOC node to operate in the identified interference channel comprises determining an information rate, a channel rate, or a symbol rate.

4. The method of claim 1 further comprising operating in the identified interference channel using the determined rate and MUD receiver algorithm that allow the SUOC node to operate in the identified interference channel.

5. The method of claim 1 further comprising determining a FUOC modulation scheme associated with the FUOC node, wherein determining a MUD receiver algorithm is further based upon the FUOC modulation scheme.

6. The method of claim 1 further comprising determining a FUOC interference-to-signal ratio (ISR) associated with the FUOC node, wherein choosing one of the plurality of multiuser detectors is further based upon the FUOC ISR.

7. The method of claim 1 wherein determining a MUD receiver algorithm comprises comparing a computational complexity of two or more MUD receiver algorithms.

8. The method of claim 1 wherein the MUD receiver algorithm is one of:
   matched filter (MF);
   matched filter successive interference canceler (MF-SIC);
   minimum mean squared error (MSEE);
   minimum mean squared error successive interference canceler (MSEE-SIC); or
   near optimal multiuser detection (MUD).

9. A method in a network having one or more first users on a channel (FUOCs) and one or more second users on a channel (SUOCs), the method comprising:
 identifying a FUOC operating in an interference channel;
 for each of a plurality of multiuser detectors available in a SUOC node, determining an associated achievable SUOC rate, wherein an achievable SUOC rate indicates a maximum rate achievable by a SUOC co-occupying the interference channel while using the associated multiuser detector;
 choosing one of the plurality of multiuser detectors based, at least in part, upon a desired SUOC transmission rate and the achievable SUOC rates;
 determining an actual SUOC transmission rate; and
 operating in the interference channel using the chosen MUD detector and the actual SUOC transmission rate.

10. The method of claim 9 wherein, for each of a plurality of multiuser detectors available in the SUOC node, determining an associated achievable SUOC rate comprises determining an associated achievable SUOC rate based upon a rate associated with the FUOC.

11. The method of claim 10 further comprises determining a FUOC transmission rate associated with the FUOC, wherein choosing one of the plurality of multiuser detectors is further based upon the FUOC transmission rate.

12. The method of claim 9 further comprises determining a FUOC modulation scheme associated with the FUOC, wherein choosing one of the plurality of multiuser detectors is further based upon the FUOC modulation scheme.

13. The method of claim 9 further comprises determining a FUOC interference-to-signal ratio (ISR) associated with the FUOC, wherein choosing one of the plurality of multiuser detectors is further based upon the FUOC ISR.

14. The method of claim 9 further comprising determining a computational complexity for each of the multiuser detectors, wherein choosing one of the plurality of multiuser detectors comparing a computational complexity of two or more multiuser detectors.

15. The method of claim 9 wherein the plurality of multiuser detectors includes at least two of:
 a matched filter (MF) detector;
 a matched filter successive interference canceler (MF-SIC) detector;
 a minimum mean squared error (MSEE) detector;
 a minimum mean squared error successive interference canceler (MSEE-SIC) detector; and
 a near optimal multiuser detection (MUD) detector.

16. A system in a network having one or more first users on a channel (FUOCs) and one or more second users on a channel (SUOCs), the system comprising:
 a radio configured to:
  identify a FUOC operating in an interference channel;
  for each of a plurality of multiuser detectors, determine an associated achievable SUOC rate, wherein an achievable SUOC rate indicates a maximum rate achievable by a SUOC co-occupying the interference channel while using the associated multiuser detector;
  choose one of the plurality of multiuser detectors based, at least in part, upon a desired SUOC transmission rate and the achievable SUOC rates;
  determine an actual SUOC transmission rate; and
  operate in the interference channel using the chosen MUD detector and the actual SUOC transmission rate.

17. The system of claim 16 wherein the radio is further configured to determine a rate at which FUOC is operating, and wherein, for one or more of the plurality of multiuser detectors, the radio is configured to determine an associated achievable SUOC rate based at least upon the rate at which the FUOC is operating.

18. The system of claim 16 wherein the radio is further configured to determine a FUOC modulation scheme associated with the FUOC, and wherein, for one or more of the plurality of multiuser detectors, the radio is configured to determine the associated achievable SUOC rate based at least upon the FUOC modulation scheme.

19. The system of claim 16 wherein the radio is further configured to determine a FUOC interference-to-signal ratio (ISR) associated with the FUOC, and wherein, for one or more of the plurality of multiuser detectors, the radio is configured to determine the associated achievable SUOC rate based at least upon the FUOC ISR.

20. The system of claim 16 wherein the plurality of multiuser detectors includes at least two of:
 a matched filter (MF) detector;
 a matched filter successive interference canceler (MF-SIC) detector;
 a minimum mean squared error (MSEE) detector;
 a minimum mean squared error successive interference canceler (MSEE-SIC) detector; and
 a near optimal multiuser detection (MUD) detector.

* * * * *